(12) United States Patent
Harvey

(10) Patent No.: US 11,142,234 B2
(45) Date of Patent: Oct. 12, 2021

(54) STEERING COLUMN ASSEMBLY

(71) Applicant: ZF Automotive UK Limited, Solihull (GB)

(72) Inventor: Phil Harvey, Birmingham (GB)

(73) Assignee: ZF Automotive UK Limited

( * ) Notice: Subject to any disclaimer, the term of this patent is extended or adjusted under 35 U.S.C. 154(b) by 0 days.

(21) Appl. No.: 17/000,638

(22) Filed: Aug. 24, 2020

(65) Prior Publication Data

US 2021/0053607 A1    Feb. 25, 2021

(30) Foreign Application Priority Data

Aug. 23, 2019 (GB) ...................................... 1912152

(51) Int. Cl.
*B62D 1/181* (2006.01)
*B62D 1/19* (2006.01)

(52) U.S. Cl.
CPC ............. *B62D 1/181* (2013.01); *B62D 1/195* (2013.01); *B60Y 2200/10* (2013.01)

(58) Field of Classification Search
None
See application file for complete search history.

(56) References Cited

U.S. PATENT DOCUMENTS

| | | | |
|---|---|---|---|
| 10,654,509 B2 * | 5/2020 | Huber | B62D 1/185 |
| 2011/0247891 A1 * | 10/2011 | Meyer | H02K 5/24 |
| | | | 180/443 |
| 2013/0315664 A1 | 11/2013 | Nias et al. | |
| 2019/0315391 A1 * | 10/2019 | Illes | B62D 5/0448 |

FOREIGN PATENT DOCUMENTS

| | | | | |
|---|---|---|---|---|
| CN | 111232044 A | * | 6/2020 | ............ B62D 1/187 |
| JP | 2016016843 A | | 2/2016 | |
| KR | 1020180003248 A | | 1/2018 | |

* cited by examiner

*Primary Examiner* — Faye M Fleming
(74) *Attorney, Agent, or Firm* — Robert James Harwood

(57) ABSTRACT

A steering column assembly includes a steering shaft, a shroud, a support bracket and a clamping mechanism which clamps the shroud to the bracket. When the clamping mechanism is unclamped, the clamping mechanism permits the shroud to pivot about the pivot assembly to enable the steering column assembly to be adjusted for rake. The pivot assembly further includes a sleeve, a ring shaped busing, and a set of circumferentially arranged spacer members. The ring-shaped bushing defines a set of circumferentially spaced resilient members that each define a contact surface that contacts one of the sleeve and the bore. The spacer members are arranged alternately with the resilient members around the whole or a substantial part of the bushing.

10 Claims, 3 Drawing Sheets

STEERING COLUMN ASSEMBLY

CROSS-REFERENCE TO RELATED APPLICATION

This application claims priority to UK Patent Application No. 1912152.4 filed Aug. 23, 2019, the disclosure of which is incorporated herein by reference in its entirety.

TECHNICAL FIELD

This disclosure relates to electric power assisted steering column assemblies.

BACKGROUND

It is known to provide a collapsible steering column assembly comprising a steering shaft that is supported within a steering column shroud. To prevent significant injury to the driver in the event of a crash the steering column should be able to collapse as an axial load is applied through the steering wheel, for instance in a front impact where an unrestrained driver is thrown onto the steering wheel.

A typical collapsible steering column assembly comprises a telescopic shroud, having an outer shroud portion and an inner shroud portion, an end of the inner shroud portion extending into the outer shroud portion. The outer shroud portion may be located closer to the steering wheel, or further from the steering wheel than the inner shroud portion. A telescopic steering shaft, also having an upper and lower shaft part, is supported inside the shroud through one or more bearing assemblies. The steering wheel is fixed to the upper shaft portion. In some cases, the shroud will not include two portions and instead the shroud will simply move relative to the bracket.

The part of the shroud closest to the wheel must be able to move, or collapse, during a crash so as to allow the steering wheel to move forwards relative to the vehicle body but be prevented from moving during normal use. There is also a need to fix the shroud relative to the vehicle body to define the rake position of the steering wheel. This is typically achieved by a clamp mechanism that secures the shroud to a support bracket that is in turn fixed to the vehicle body, perhaps to a cross beam provided behind the dashboard of the vehicle or to a mounting bracket fixed to the cross beam.

To permit rake adjustment the clamp mechanism typically includes a clamp pin that can move up and down along a generally vertical slot in the support bracket. A lever may be provided that forms a part of the clamp mechanism that the driver can push or pull to rotate the clamp bolt and thereby operate the clamp mechanism between a clamped condition and an unclamped one.

The clamp mechanism may also be adjustable to permit reach adjustment of the steering wheel. In this case the clamp bolt may be free to move along a generally horizontal slot in the shroud when the clamp mechanism is in the unclamped condition.

SUMMARY

The present disclosure applies to steering mechanism that adjusts for rake and optionally also mechanisms that adjust for reach.

Where the steering assembly is adjustable for rake, a pivot assembly is required to allow the shroud to rotate for column rake adjustment. The pivot assembly needs to ensure consistent low drag during operation so as not to affect the feel when moving the column. The pivot assembly also need to resist any movement due to torque being applied by the motor as any movement would be felt by the driver. The pivot assembly should be located on the opposite side of the support bracket to the steering wheel.

According to a first aspect the disclosure provides a steering column assembly comprising a steering shaft, a shroud that supports the steering shaft through at least one bearing assembly and which in use supports a steering wheel at one end, an electric motor connected to the steering shaft through a gearset located within a gearbox housing, a support bracket secured to a first fixed part of the vehicle, a pivot assembly which in use connects the steering column assembly to a second fixed part of the vehicle, and a clamping mechanism which in a clamped condition clamps the shroud to the bracket and in an unclamped condition permits the shroud to pivot about the pivot assembly to enable the steering column assembly to be adjusted for rake, in which the pivot assembly comprises a sleeve that has cylindrical portion, the sleeve being located within a respective oversized bore that extends through the gearbox housing orthogonal to the axis of the steering shaft, and a ring shaped bushing that is fitted onto the cylindrical tubular portion and defines a set of circumferentially spaced resilient members that each define a contact surface that contacts one of the sleeve and the bore, and a set of circumferentially arranged spacer members which each define a contact surface that contacts the other one of the sleeve and the bore, the spacer members being arranged alternately with the resilient members around the whole or a substantial part of the bushing.

Preferably the resilient members define an outer contact surface that contacts the bore and the spacer members define an inner contact surface the contacts the sleeve.

The assembly of the disclosure provides a pivot assembly including a bush that is so formed as to effectively act as set of annular springs having inner and outer contact faces that co-operate with the pivot pin and housing respectively.

The ring-shaped bushing may comprise a continuous wavy ring that extends around the complete circumference of the respective tubular portion of the sleeve. The resilient members and spacer members may extend around the whole or a substantial part of the complete circumference.

A circumferential region of the bushing extending around up to 20 degrees of the circumference of the bushing may be free of resilient members or spacer members to enable the ring to expand or contract in diameter as the sleeve moves within the bore.

Each of the resilient members may define an arc shaped leaf spring having an axis of curvature that is parallel to and spaced outwardly from the central axis of the bushing to define a part of an annulus when viewed in cross section along the axis of the bushing with the outer contact surface being defined by an outwardly facing narrow curved central segment of the resilient member.

Each arc may be joined at the ends to a pair of adjacent spacer member although where the bushing includes a gap where there is no resilient member of spacer member the resilient members nearest each end may join a spacer on one end only.

The spacer members may be generally planar or may be slightly contoured to match the outer surface of the bushing. They may contact the bushing over their whole area.

The inner surfaces and resilient members may be considered together form a ring which has a wavy cross section similar to that of a fluted cutter defining a set of spaced arc shaped leaf springs around the sleeve. These springs help locate the sleeve towards the centre of the bore and in particular help resist any rotation of the shroud resulting from torque applied to the steering shaft by the motor.

The line of contact defined by each resilient member with the bore may have a length, measured in a direction parallel to the axis of the bushing that is at least 5 times the width, or at least 10 times the width of the contact area of the resilient member with the bore.

The provision of arcuate resilient members thereby provides a narrow band of line contact of sufficient length as to robustly support the torsionally transmitted loads. The narrow band of contact ensures a low friction interface which can either allow the pivot pin to rotate in the bush or the bush to rotate in the housing so as to ensure that the minimum resistance to rotation is provided.

The ends of each resilient member may respectively connect to an adjacent spacer member whereby the inner spacer member lies on a circumference of a circle and the outer contact surfaces lie on the circumference of a circle of larger diameter.

When the bushing is installed between the sleeve and the bore at least one or preferably all of the resilient members may be placed in compression to provide a radial load onto the inner face of the bore.

The bushing may include a radial flange that is connected on one face to an end of an axial strip of material that forms the resilient members and spacer members. The flange may be continuous or may include a discontinuity that is aligned with a discontinuity in the annular band.

The bushing may be arranged such that the flange abuts a radial shoulder formed at an outer end of the bore to locate the bushing axially along the sleeve.

The pivot assembly may include a pivot pin that passes through the sleeve and projects from each end of the sleeve. During rake adjustment, the sleeve may rotate around the pivot pin. The bush may rotate with the sleeve or may remain fixed against rotation by the gearbox housing.

The pivot pin may be secured to a fixed part of the vehicle, for example using a nut that is threaded onto each end of the pivot pin. These may be located outboard of the bore through which the sleeve passes.

The sleeve and bush of the pivot assembly may be located in a bore formed in a cover portion of the gearbox housing.

The bushing may be a metal component or a plastic component.

Two ring shaped bushings may be provided, spaced apart along the sleeve and each located toward a respective end of the sleeve, Each may have the features set out in the preceding description, and they may be identical or may be handed but otherwise identical. Of course, they need not be identical in some arrangements.

The steering column assembly may further include a Support bracket located below the mounting bracket, the two brackets being connected together during normal operation by at least one frangible connector.

BRIEF DESCRIPTION OF THE DRAWINGS

There will now be described by way of example of the present disclosure with reference to and as illustrated in the accompanying drawings of which.

DETAILED DESCRIPTION

Figure 1A:
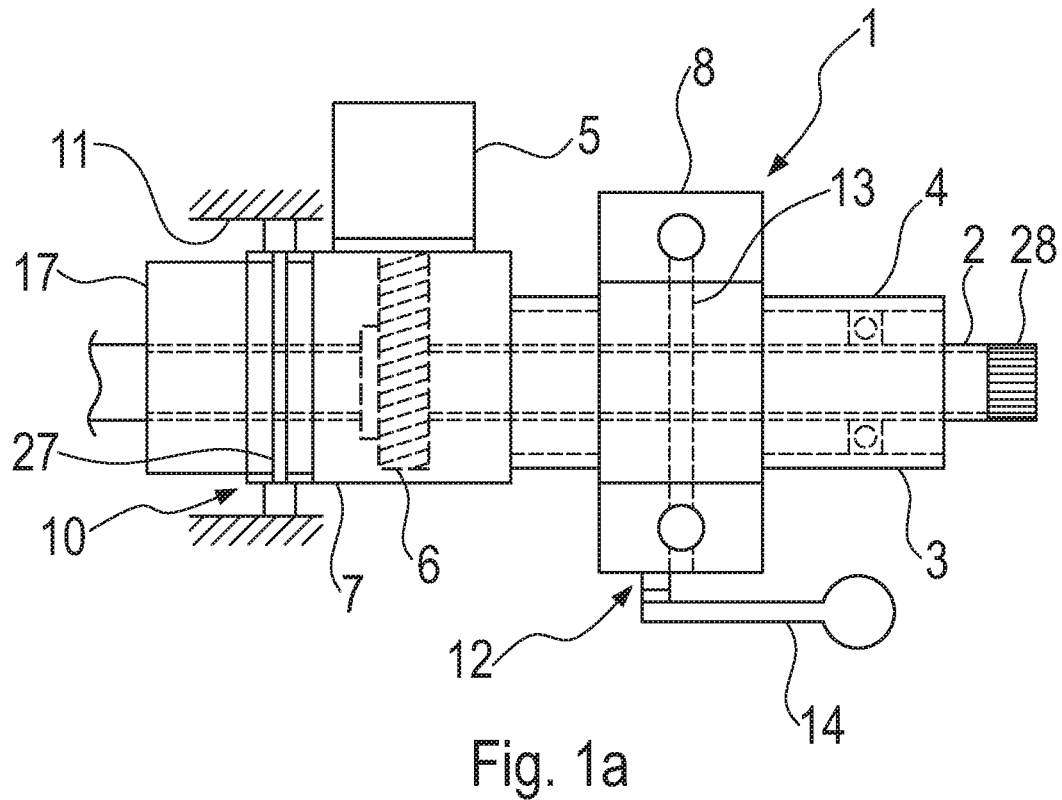
FIG. 1(a) is an illustration of the main components of an embodiment of a steering column assembly in accordance with the present disclosure viewed from above.
Figure 1B:
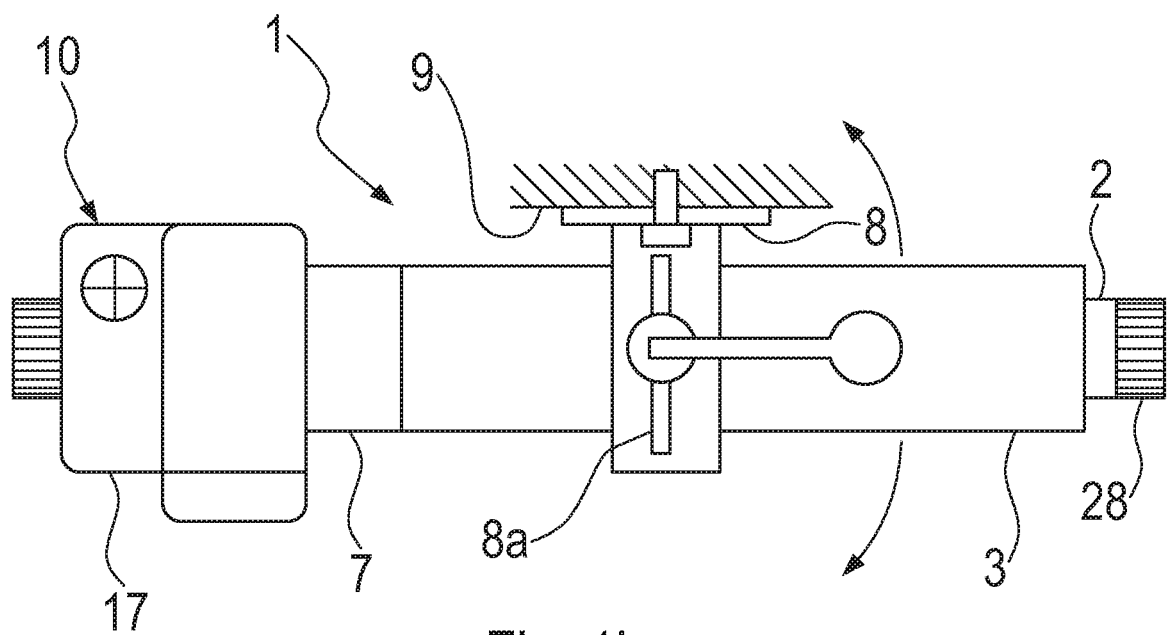
FIG. 1(b) is an illustration of the steering column assembly of FIG. 1(a) viewed from the side.

As shown in FIGS. 1(a) and 1(b), a steering column assembly 1 for a vehicle comprises a two part telescopic shroud 3 that surrounds a steering shaft 2. The shroud may have two parts, an upper part of the steering shaft protruding from a lower part of the shroud and is terminated with a splined coupling 28 allowing a steering wheel boss (not shown) to be fixed to the steering shaft 2. The opposite end of the shaft 2 may connect to a gearset 6 located in a gearbox housing 7.

The shroud 3 fits telescopically around the shaft 2 allowing the length of the shroud to the adjusted telescopically. This enables the reach of the steering wheel to be adjusted and also allows for collapse of the steering wheel in the event of a crash where a load such as an unrestrained driver is applied to the steering wheel. The disclosure may apply to steering column assemblies that do not adjust for reach, in which case the shroud will not be adjustable but should still be able to collapse in the event of a crash.

A support bracket 8 is provided which has an upper part that is secured to a first fixed part 9 of the vehicle body. Two arms depend from this, one each side of the shroud. Each has a vertical slot 8a through which clamp pin of a clamp mechanism 12 passes. A lever 14 allows a driver to clamp and unclamp the clamp mechanism to prevent or permit the shroud to move up and down relative to the support bracket. During movement the clamp pin moves along the vertical slot 8a.

Figure 2:
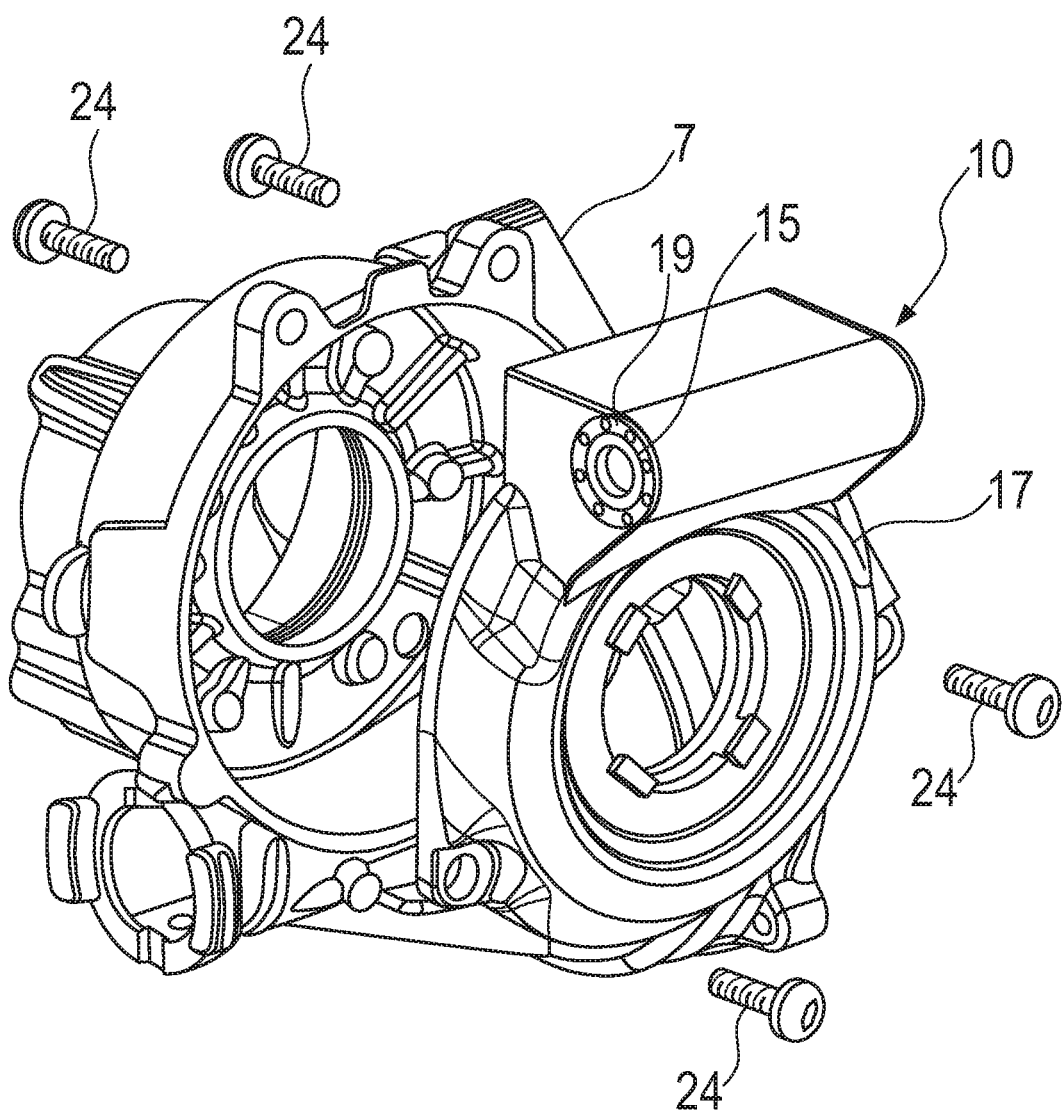
FIG. 2 is an exploded view of the gearbox housing and the fixing bolts.

As shown in FIG. 2, the gearbox housing has two main parts, a main body part on the left in the drawing and a removable housing cover part 17 on the right. The two are fixed together with bolts 24 to house the gearset 6. An electric motor 5 is fixed to a side of the housing and has a rotor that is orthogonal to the axis of the steering shaft. The rotor applies a torque to the shaft 2 through the gearset 6.

Figure 3:
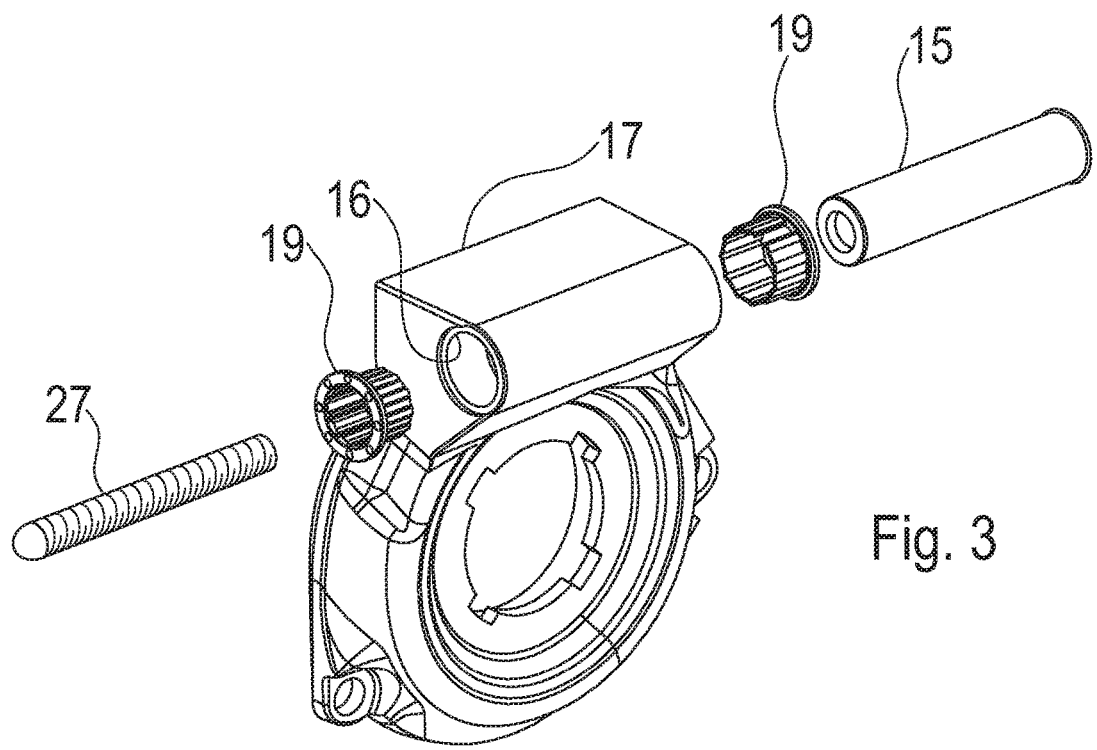
FIG. 3 is a view showing a part of the gearbox housing and the components of a pivot assembly that fixes the gearbox housing to the vehicle.
Figures 4, 5:
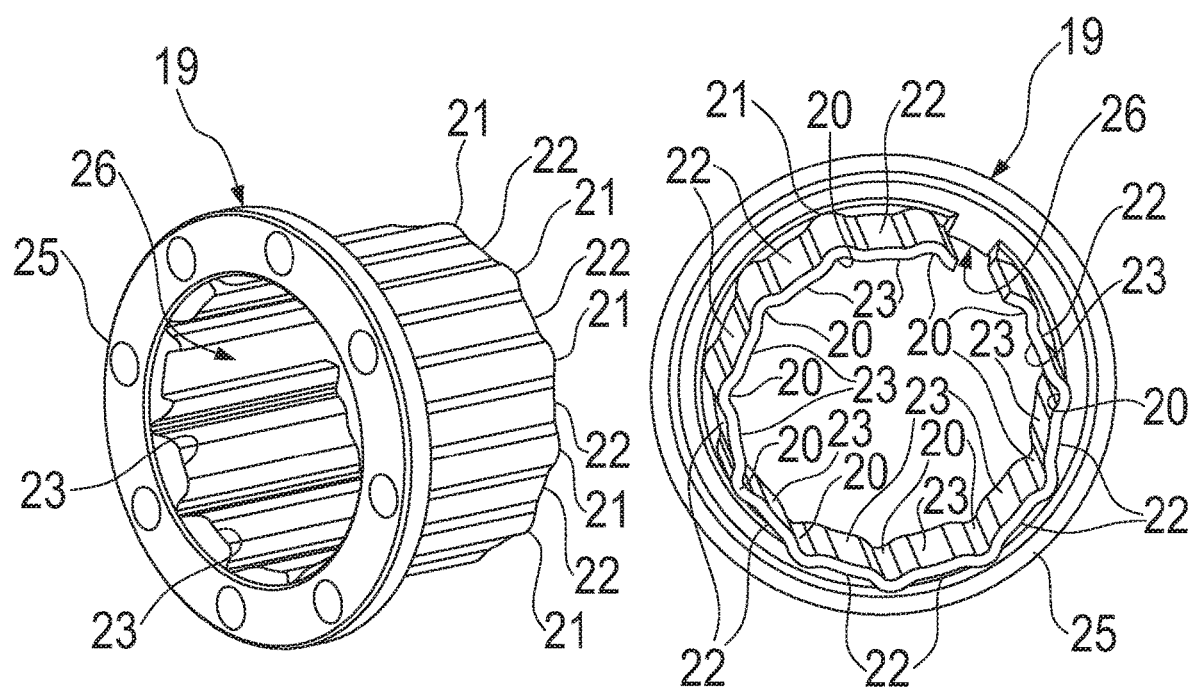
FIG. 4 is an enlarged view of the bushing of the pivot assembly.
FIG. 5 is an alternative view of the bushing of FIG. 4.

At an upper region of the housing cover part 17 is a pivot assembly 10, The pivot assembly 10 is shown in exploded view in FIG. 3, and the bushing is shown in in FIGS. 4 and 5 of the drawings.

The pivot assembly 10 comprises five distinct components. An oversized bore 16 that are formed in the cover of the gearbox housing, although it could be formed in another part of the housing. A tubular sleeve 15 defining two cylindrical portions passes through the bore. A pair of plastic injection moulded bushings 19 each support a respective end of the sleeve 15 within the bore 16, and finally a pivot pin 27 passes through the sleeve. The pin has threads at each end allowing it to be secured to a fixed part of the vehicle body.

In use the steering column assembly 1 may pivot around the pivot pin 27 to adjust for rake.

The tubular sleeve 15 in this example is a hollow cylinder with a uniform cross section along it length so as to define the two cylindrical portions at opposing ends. Each of these end portions is located within the oversized bore 16 of the cover. The outer diameter of the sleeve 15 is smaller than the inner diameter of the bore 16 to define an annular space 18 between the sleeve 15 and the bore 16. This space is occupied by the bushing 19 that surrounds a circumference of the sleeve.

The bushing 19 comprises a ring that defines a set of circumferentially spaced resilient members 20 that each define an outer contact surface 21 that contacts the bore 16 and a set of circumferentially arranged spacer members 22 which each define an inner contact surface 23, the spacer members 22 being arranged alternately with the resilient members 20 around a substantial part of the bushing 19. When assembled the outer contact surfaces 21 each define a line contact with the bore 16 and the inner spacers 22 define a broader area of contact with the sleeve 15.

In addition to the ring of alternating resilient members 20 and spacer members 22, a flange 25 is provided at one end to give support to the ring and to provide a mating surface upon a shoulder defined on the end of the bore 16.

Each of the resilient members 20 is arcuate and is curved about an axis that is parallel to the axis of rotation of the bushing 19 to define a part of an annulus when viewed in cross section along the axis of the bushing. The outer contact surface 21 is defined by an outwardly facing narrow central segment of the resilient member 20. Each resilient member 20 is joined at each end to an adjacent spacer 22 apart from those at the very end of the ring which face each other across a small gap 26. This gap 26, which is not essential in all embodiments, permits additional deformation of the bushing as the resilient members deform under load.

In use, each arcuate resilient member 20 helps centralize the sleeve in the bore and prevents unwanted radial movement of the sleeve during adjustment of the steering column assembly by acting as a set of wavy springs, whilst the line contacts of the part annular resilient members resist any twisting of the gearbox housing 7 when torque is applied by the motor (not shown) yet provides low frictional resistance to rotation of the bushing 19 relative to the sleeve 15.

What is claimed is:

1. A steering column assembly comprising:
    a steering shaft;
    a shroud that supports the steering shaft through at least one bearing assembly and which in use supports a steering wheel at one end, an electric motor connected to the steering shaft through a gearset located within a gearbox housing;
    a support bracket secured to a first fixed part of the vehicle, a pivot assembly which in use connects the steering column assembly to a second fixed part of the vehicle; and
    a clamping mechanism which in a clamped condition clamps the shroud to the bracket and in an unclamped condition permits the shroud to pivot about the pivot assembly to enable the steering column assembly to be adjusted for rake,
    wherein the pivot assembly further comprises
    a sleeve that has cylindrical portion, the sleeve being located within a respective oversized bore that extends through the gearbox housing orthogonal to the axis of the steering shaft, and
    a ring shaped bushing that is fitted onto the cylindrical tubular portion and defines a set of circumferentially spaced resilient members that each define a contact surface that contacts one of the sleeve and the bore, and
    a set of circumferentially arranged spacer members which each define a contact surface that contacts the other one of the sleeve and the bore, the spacer members being arranged alternately with the resilient members around the whole or a substantial part of the bushing.

2. The steering column assembly as defined in claim 1, in which the resilient members each define an outer contact surface that contacts the bore and the spacer members each define an inner contact surface the contacts the sleeve.

3. A steering column assembly as defined in claim 1, in which the ring shaped bushing comprises a wavy ring that extends around the whole or a substantial part of the complete circumference.

4. A steering column assembly as defined in claim 2, wherein each of the resilient members defines an arc shaped leaf spring having an axis of curvature that is parallel to and spaced outwardly from the central axis of the bushing to define a part of an annulus when viewed in cross section along the axis of the bushing with the outer contact surface being defined by an outwardly facing narrow curved central segment of the resilient member.

5. A steering column assembly as defined in claim 2, wherein the spacer members are generally planar or contoured to match the outer surface of the bushing.

6. A steering column assembly as defined in claim 4, whereby bushing is installed between the sleeve and the bore such that at least one or of the resilient members is placed in compression to provide a radial load onto the inner face of the bore.

7. A steering column assembly as defined in claim 6, wherein the bushing includes a radial flange that is connected on one face to an end of an axial strip of material that forms the resilient members and spacer members.

8. A steering column assembly as defined in claim 1, wherein the pivot assembly includes a pivot pin that passes through the sleeve and projects from each end of the sleeve.

9. A steering column assembly as defined in claim 7, wherein the bushing is a plastic component.

10. A steering column assembly as defined in claim 9, further comprising two ring shaped bushings, each spaced apart along the sleeve and each located toward a respective end of the sleeve.

* * * * *